United States Patent [19]
Carpenter et al.

[11] Patent Number: 5,620,018
[45] Date of Patent: Apr. 15, 1997

[54] EMERGENCY SPILL COLLECTOR

[76] Inventors: Wade I. D. Carpenter, 4285 S. 18th St. West; Raymond G. Corbus, R.R. 2, Box 459, both of Mountain Home, Id. 83647

[21] Appl. No.: 382,291

[22] Filed: Jan. 31, 1995

[51] Int. Cl.$^6$ .............. B65B 39/02; B65B 3/00; F16K 51/00
[52] U.S. Cl. .......... 137/312; 141/114; 220/573
[58] Field of Search .................. 137/572, 312; 220/573, 571; 184/106; 222/108; 141/86, 114, 282, 337

[56] References Cited

U.S. PATENT DOCUMENTS

| | | | |
|---|---|---|---|
| 3,815,646 | 6/1974 | Coakley | 141/337 |
| 5,099,872 | 3/1992 | Tarvin et al. | 220/573 |
| 5,516,318 | 5/1996 | Saylor | 137/312 |

*Primary Examiner*—James Larson
*Attorney, Agent, or Firm*—Ken J. Pedersen; Barbara S. Pedersen

[57] ABSTRACT

Described is a collector/reservoir made of flexible and chemically-resistant material. The collector/reservoir has an open top, and side walls which are quickly inflatable with air or some other gas or fluid. When the side walls are inflated, the collector/reservoir quickly obtains more shape and rigidity, and it may be easily placed under the source of the spill to collect the spilling material. At, in or near its bottom, the collector/reservoir is provided with one or more conduits from its interior volume to its outside surface, each provided with a quick-connect fitting. This way, the spill material from the collector/reservoir may be drained to another storage or transport reservoir connected to the collector/reservoir by the quick-connect fitting.

7 Claims, 3 Drawing Sheets

EMERGENCY SPILL COLLECTOR

BACKGROUND OF THE INVENTION

1. Field

This invention relates generally to spills of dangerous materials, and more specifically to a compact but expandable collector for spills of dangerous liquids.

2. Related Art

In the transportation field, for example, accidents often cause the release of dangerous materials into the environment. At a truck crash site, often the truck's diesel fuel and engine lubricating oil are spilled on or next to the highway, creating a hazard and environmental problem even when the truck's load is not dangerous or spilled. When a truck's dangerous load is spilled, or when a train with tank cars carrying dangerous materials is wrecked, these hazards and environmental problems are often compounded.

Presently, it is the practice to pick up spilled materials at a truck or train crash site with a solid absorbent spread on the ground, or to squee-gee the spilled materials to the side of the road or right-of-way where they are absorbed by the ground. This practice is inefficient in that the solid absorbent or the ground, filled with the spill material, must itself then often be handled and disposed of as a toxic waste, which is expensive. Also, this practice is dangerous in that personnel involved in the clean-up are potentially exposed to large quantities of the spill material spread over a large area.

What is needed then, is a quick, safe and inexpensive way to minimize the amount of dangerous spill material allowed to be released at the vehicle crash site. Also, what is needed is a safe way to clean up the spilled dangerous material, and minimize contact between it and the environment or personnel. The present invention addresses this need.

SUMMARY OF THE INVENTION

The invention is a collector/reservoir made of flexible and chemically resistant material. The collector/reservoir has an open top, closed bottom and side walls which are quickly inflatable with air or some other gas or fluid. When the side walls are not inflated, the collector/reservoir may be made to lay generally flat, and it may be rolled or folded up for convenient, compact storage. When the side walls are inflated, the collector/reservoir quickly obtains its more rigid inflated shape including an interior volume, an inside surface, and an outside surface. This way, the collector/reservoir may be easily placed under the source of the spill to collect the spilling material. The collector/reservoir may be of any shape that creates a sizeable interior volume. In some embodiments, the inflation tends to unroll or unfold the collector/reservoir underneath the leaking equipment. Alternately, the collector/reservoir may be manually unrolled or spread out under the leaking equipment and then inflated, or the collector/reservoir may be inflated and then pushed or pulled under the spill source. This way, the spilling material is contained and prevented from running free and spreading out over the ground.

At, in or near its bottom, the collector/reservoir is provided with one or more conduits from its inside surface to its outside surface. These conduits are each provided with preferably a valve and a quick-connect fitting. This way, the collected spill material in the reservoir may be kept in the reservoir by closing the valve, or allowed to exit the reservoir by opening the valve. Also, this way, the spill material from the collector/reservoir may be drained to another storage or transport reservoir connected to the collector/reservoir by the quick-connect fittings.

The storage or transport reservoir may be a bladder or other closed envelope, also made of flexible and chemically resistant material. The bladder may be of any shape which encloses a sizeable volume. The bladder is also provided with one or more conduits from its outside to its inside, and each of these conduits are also provided with a valve and a quick-connect fitting. This way, the bladder may be quickly and easily connected to the collector/reservoir described above. Also this way, the bladder may be easily isolated from the collector/reservoir for convenient and safe removal and disposal of the bladder or disposal of the bladder contents.

DESCRIPTION OF THE PREFERRED EMBODIMENTS

Figure 1:
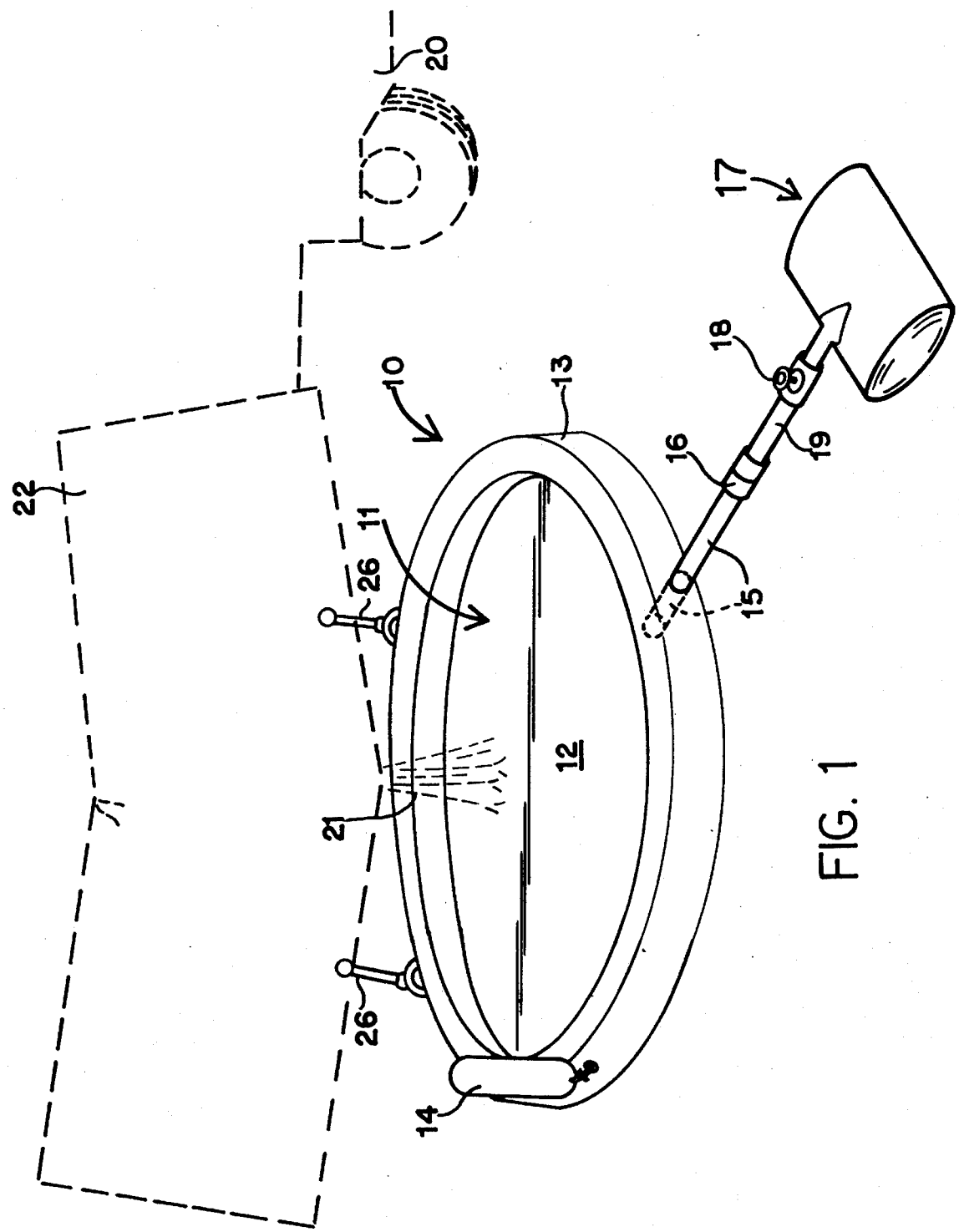
FIG. 1 is a side, isometric partial view of one embodiment of the invention placed under a truck's leaking fuel tank.

Referring to the Figures, there are depicted several, but not all, embodiments of the invention. In FIG. 1, collector/reservoir 10 has an open top 11, bottom 12, and inflatable side walls 13. Side walls 13 are hollow and adapted to receive air or other gas or liquid at inflator assembly 14. Inflator assembly 14 may be a stem-type valve fillable by mouth or by hand like those in inflatable wading pools and bicycle tires. Alternatively, an auto-inflator may be used, which quickly injects gas or chemical into the side walls 13, to inflate the collector/reservoir in several seconds, that is, preferably less than 10 or 20 seconds. In one preferred embodiment, inflator assembly 14 is a pressurized canister of gas which can fill and inflate side walls 13 in several seconds. Also, in an alternate preferred embodiment, inflator assembly 14 is a chemical container with reactants in it which can fill and inflate side walls 13 in several seconds. Preferably, the gas in the canister or from the chemical container is nitrogen, carbon dioxide or some other relatively inert gas for safety reasons. Preferred inflator assemblies are self contained in that they do not use air from the crash site to inflate the side walls 13. Also, preferred inflators are easily, quickly and reliably activated by clean-up personnel. One specific embodiment of the actuator is a high pressure aluminum canister carrying the amount of moles of gas molecules sufficient to fully inflate the collector/reservoir 10. The aluminum canister has a quick-open valve design, and a discharge nozzle design which maximizes discharge flows while maintaining canister stability. The quick open valve is activated by a pneumatic solenoid switch.

Side walls 13 and bottom 12 are made from a flexible, corrosion-resistant material. By "flexible" we mean able to be repeatedly rolled or folded up when not in use for convenient, compact storage, and able to be repeatedly unrolled quickly for use. By "corrosion-resistant" we mean able to withstand the degrading effects of chemical solvents, petrochemicals, fuels, acids, bases, and oxidation and reduction reactions. Also, this material must be resistant to UV, IR, X-Ray, extremes of temperature and pressure, and hard use, wear and tear. Also, this material must be air-tight, or impermeable to the gas or liquid which inflates side walls 13 and impermeable to the spilled liquids or solids that are collected in the collector/reservoir 10 interior volume. This material must have these features, as well as durability, over broad temperature and humidity ranges. Several preferred materials are sandwich-style compositions of nylon and vulcanized rubber or polypropylene, for example.

Side walls 13 or parts of the side walls 13 are hollow, and they may be inflated or filled with a gas or liquid at inflator assembly 14. Walls 13 may be single or multiple units in vertical and horizontal directions. The walls 13 may have inner or outer structural devices which help maximize sturdiness of the walls upon inflation. They may contain inner or outer envelopes which are selectively inflated to help minimize the volume of gas or liquid required to inflate them.

Side walls 13 are connected to bottom 12, preferably in a fluid-tight fashion. This way, the combination of walls 13 and bottom 12 makes a fluid-tight collector/reservoir 10. Bottom 12 is preferably made from a flexible, corrosion-resistant material also. This way, collector/reservoir 10 may be easily deflated after use and conveniently rolled or folded up for storage for many, many uses. Bottom 12 may also have hollow regions which may be inflated.

Collector/reservoir 10 has a conduit 15 extending from its inside surface, through wall 13 or bottom 12, to its outside surface. This way, collector/reservoir 10 may be emptied by draining out through conduit 15. Also, conduit 15 may be used as an inlet from the outside of collector/reservoir 10, in order to fill collector/reservoir 10. The collector/reservoir 10 may optionally have a plurality of conduits, for example, exiting the wall 13 or bottom 12 from various positions around the collector/reservoir 10. Preferably, the conduit 15 exits the collector/reservoir at or slightly above the level of the bottom 12. Conduit 15 may have a valve in it to control flow through it. Conduit 15 may terminate at, or extend beyond, the outside surface of collector/reservoir 10. Safety close caps may be provided for the outside end of conduit 15.

Conduit 15 has a quick-connect fitting 16 at or near its outside end. This way, compatible lines, drains and other equipment or components may be quickly and easily attached to conduit 15. Quick-connect fitting 16 should seal tightly so that no leakage or other loss of spilled material is encountered. Quick-connect fitting 16 should also seal repeatedly so that the collector/reservoir 10 may be drained of a large volume in discreet, smaller volumes and/or may be used repeatedly. Preferred quick-connect fittings are snap-in resilient pieces, or hand-assisted locking connections like Cam-Lock TM fittings. The quick-connect fitting 16 may be manufactured with an integral knife-style valve mechanism.

One piece of equipment that may be attached to collector/reservoir 10 via quick-connect fitting 16 is a bladder receptacle 17. Bladder 17 has a block valve 18 in line 19, and is compatible with quick-connect fitting 16. This way, spilled material which is collected in collector/reservoir 10 may be drained from it and transferred to bladder 17. Then, bladder 17 may be isolated from collector/reservoir 10 by valve 18 for safe, convenient transport, storage and disposal of the contents of bladder 17. Bladder 17 may have a plurality of lines 19, each with block valve 18. This way, several bladders may be connected in series or in parallel to collector/reservoir 10, or to each other. Bladder 17 may also be equipped with other features, for example, with vents, pressure safety devices, drains, handles, etc.

Another piece of equipment which may be attached to collector/reservoir 10 via quick-connect fitting 16 is a transfer line. This way, spilled material which is collected in collector/reservoir 10 may be drained or vacuumed to a portable tank, bin or other storage unit. Also, this way, collector/reservoir 10 may be drained or vacuumed to a more remote location, farther away from the hazards of the spill site, or downhill or upwind from the spill site as desired. Alternatively, in lieu of using a conduit 15, a transfer line may be placed directly into the interior volume of the collector/reservoir for pumping or vacuuming of the spilled material directly out from the interior volume.

Also, loops or eyelets for cords or ropes 26 may be provided on the outside surface of collector/reservoir 10. This way, the collector/reservoir 10 may be tied by the cords or ropes 26 to secure it in position. Preferably, the cords or ropes will be weighted at their ends to facilitate throwing them, looping them up or across and around pieces of equipment at the crash site.

After a highway truck accident, for example, a truck 20 may begin to leak diesel fuel 21 from a fuel tank 22. The diesel fuel 21 may fall to the ground in a trickle or a torrent, or even a spray. With our invention, the rolled or folded compact package containing collector/reservoir 10 is placed on the ground near the leak. Then, the clean-up operator activates inflator assembly 14, and the walls 13 inflate quickly to give the collector/reservoir 10 its upright inflated shape. When the collector/reservoir 10 is folded properly, and the inflator assembly 14 is sized properly relative to the interior volume of walls 13, the collector/reservoir 10 will unroll or unfold automatically as the walls 13 inflate. This way, the collector/reservoir 10 may be placed under the leak 21 by the clean-up operator without requiring that the operator get very close to the leak, or crawl or reach under leaking equipment.

Figure 2:
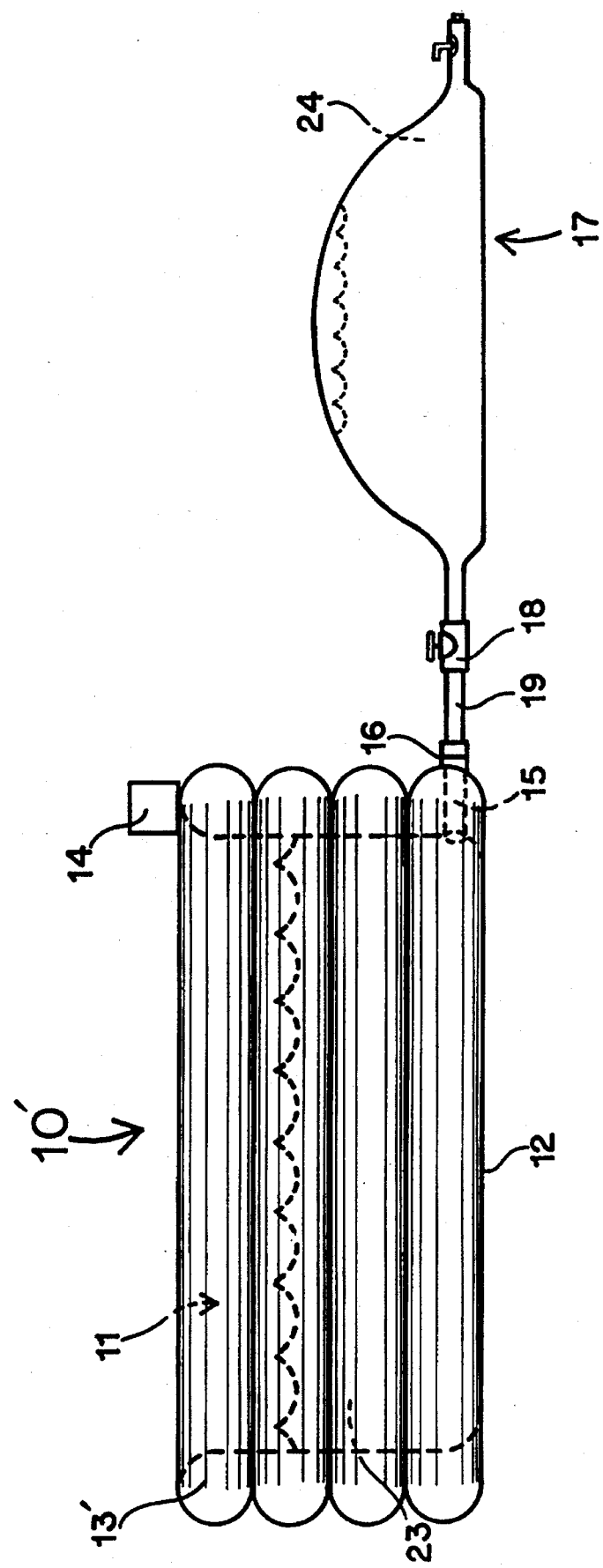
FIG. 2 is a side, partial cross-sectional view of another embodiment of the invention with the collector reservoir partially filled with liquid.

In FIG. 2, collector/reservoir 10' has an open top 11, bottom 12, and inflatable side walls 13', which side walls 13' are inflated by inflator assembly 14. In the embodiment depicted in this Figure, side walls 13' are multiple, stacked cylindrical tubes with fluid passageways interconnecting their respective interior volumes. The interior volume of collector/reservoir 10' contains a pool 23 of collected spilled material. A portion of pool 23 has been drained into bladder receptacle 17 to create bladder amount 24. Line 19 interconnects bladder 17 and collector/reservoir 10' via valve 18, quick-connect fitting 16 and conduit 15.

As shown in FIGS. 1 and 2, bladder 17 may hold a smaller volume than the volume of the collector/reservoir 10 or 10', for example, for repeated filling of several bladders, or for situations where the total spill volume is significantly smaller than the collector/reservoir 10 or 10' interior volume. Alternately, a larger bladder may be used when handling, transporting, and safe draining of a large bladder is convenient.

Figure 3:
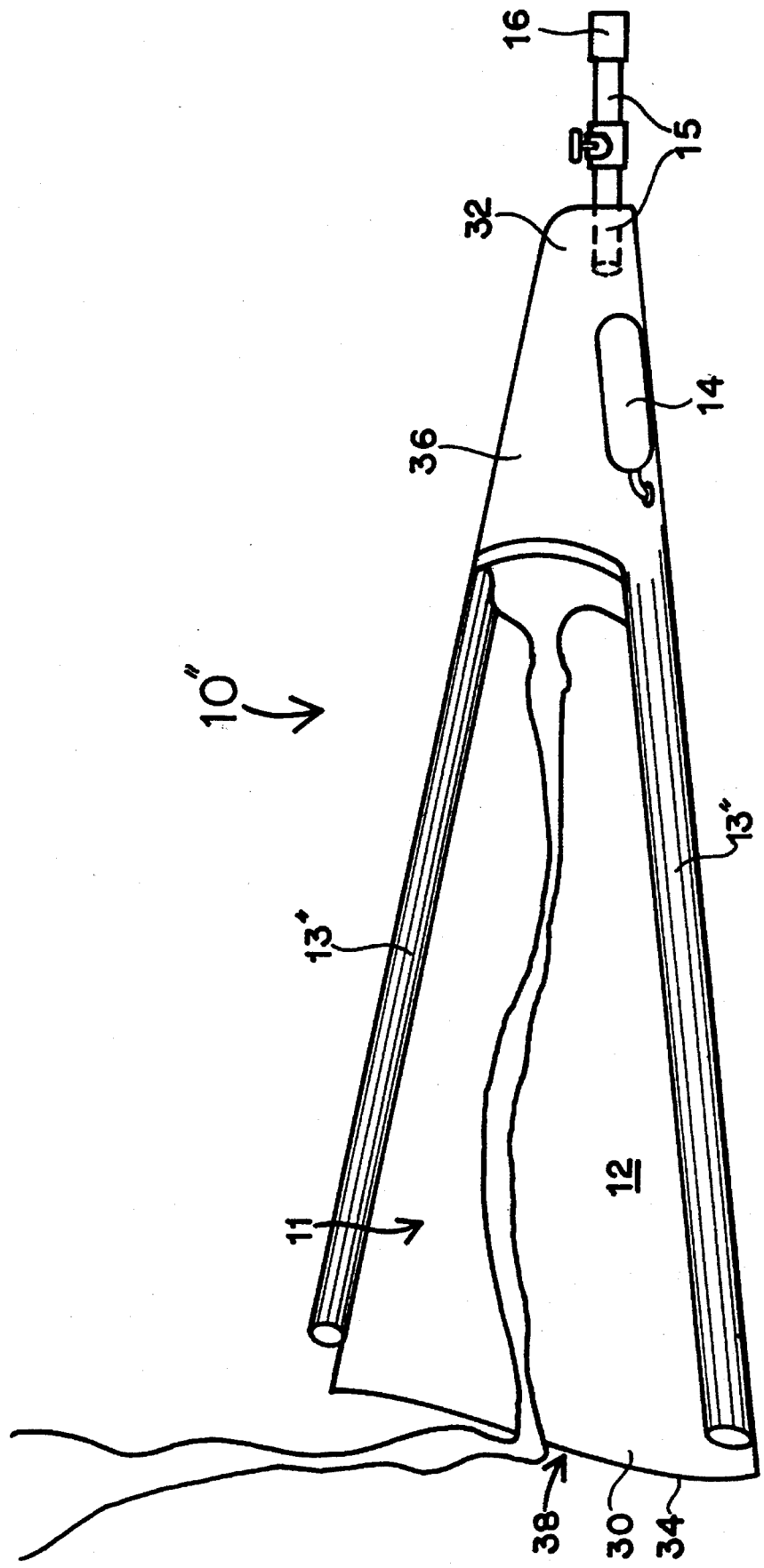
FIG. 3 is a side, isometric view of another embodiment of the invention with a flat edge that is placed on the ground to allow collection of a waste stream that flows over the flat edge.

In FIG. 3, the collector/reservoir 10" includes open top 11, a bottom 12 and inflatable side walls 13" that are inflatable by an inflator assembly 14. This "apron" design collector/reservoir 10" is of a generally triangular shape, with a wide end 30 of the flat bottom 12 narrowing to narrow end 32. The side walls 13" of the "apron" design collector/reservoir 10" provide a barrier on two sides, while the edge 34 of the bottom 12 on the third, wide side is a flat edge 34 without a side wall for placement flat against the ground or other surface onto which the spill is leaking.

The apron collector/reservoir 10" is useful for spills where a spread out or sprayed leak spills onto a large area. For example, the wide end 30 may be 20 feet wide to fit under a leaking tank seam or a spray. The wide, flat end 30 collects the spill and spilled liquid flows downhill into the narrow end 32. The narrow end 32 is an inflated pocket for holding a volume of liquid until it can be emptied through conduit 15 and quick-connect fitting 16 which may contain a valve. If the leak is spilling onto a hard, generally liquid-impermeable surface such as a paved road, then the flat wide end 30 may be placed downhill from but not necessarily directly underneath the leak. This way, the spilled liquid falls or sprays on the hard surface and then runs downhill into the collector/reservoir 10". If the leak is spilling onto soft, uneven, or permeable surface such as dirt or a railroad track, then the wide end 30 is preferably placed under the leak like a tarp/funnel to catch the liquid. Optionally, the wide end 30 may include or be adapted to receive ropes, cords, hooks, or other attachment means for assisting in wrapping or hanging the wide end 30 around or underneath a leaking object. For example, a leak spraying out of a cracked valve casing could be collected by partially wrapping the wide end 30 around the leaking valve. The collector/reservoir 10" may be quite long, for example, 60 ft., for guiding liquid a long distance downhill from the leak.

The flat edge 34 and the wide end 30 of collector/reservoir 10" should be quite flexible for flat and intimate contact with the surface upon which they lie. This prevents spilled liquid from flowing underneath the flat end 34. Also, flat edge 34 may have magnetic and/or adhesive elements to help attach collector/reservoir 10" to pieces of equipment at the crash site.

The side walls 13" may extend along the entire length of the collector/reservoir 10", as shown in FIG. 3. Optionally, the side walls 13" may extend part of the way from the narrow end 32 to the wide end 30, as long as the side walls 13" act to trap the spill and guide it to flow into the inflated pocket at the narrow end 32. The inflated pocket shown in FIG. 3 has a top 36, which helps contain the liquid, but, optionally, the pocket may have an open top and higher side walls for splash-free collection of liquid at the narrow end 32.

As an alternative to the apron embodiment of FIG. 3, the collector/reservoir may include designs that have other shapes of side walls with a hole, opening, or other gap 38 in the side walls for allowing spilling material to enter the collector/reservoir interior volume. The gap may be other shapes than the open, wide end 30 of the apron embodiment, for example, any gap in the side wall that extends down to the bottom 12, so that spilling material can flow into the collector/reservoir over a perimeter edge of the bottom. Preferably, the perimeter edge of the bottom, over which the spilling material flows, is flat and thin, so that little or no obstacle lies in the path of the flowing spill. The term "extending down to the bottom" means that the gap 38 may extend to, close, or near to the bottom of the collector/reservoir. Thus, in such embodiments, the bottom has a portion which is not attached to a side wall or there is a opening in the side wall above a portion of the side wall.

The invented collector/reservoir allows a very quick and efficient response to a spill of hazardous material. The collector/reservoir has a bottom and an inflatable side wall which quickly becomes a barrier to and collector for the spilling material, and a conduit from inside to outside for safe and controlled emptying of the collector/reservoir. The conduit preferably has a quick-connect valve, which shuts off flow from out the conduit as long as the quick-connect is disconnected from another line, bladder, or pumping system, but which allows flow when the quick-connect is connected to the other line, bladder, or pumping system. The compact, light-weight and simple system is excellent for storage and use aboard vehicles, such as diesel trucks, trains, and emergency vehicles. The collector/reservoir may be unrolled/inflated for use in a manner of seconds and connected to a bladder or other storage means for drainage and containment in a manner of seconds.

Although this invention has been described above with reference to particular means, materials and embodiments, it is to be understood that the invention is not limited to these disclosed particulars, but extends instead to all equivalents within the scope of the following claims.

What we claim is:

1. A collector/reservoir for collecting spilling material, the collector/reservoir being made of flexible and chemically-resistant material, and having an interior reservoir volume and an outside surface, said collector/reservoir comprising:

a bottom;

hollow side walls connected to said bottom, said side walls having interior wall volumes interconnected with fluid passage-ways, said side walls being inflatable in less than 20 seconds, and, when inflated, said side walls giving shape and increased rigidity to said interior volume created by said bottom and said side walls;

an auto-inflator for inflating said side walls in less than 20 seconds;

a conduit from said interior volume to said outside surface of said collector/reservoir, said conduit having a quick-connect fitting.

2. The collector/reservoir of claim 1, wherein the auto-inflator comprises a canister of pressurized gas.

3. The collector/reservoir of claim 1, wherein the conduit extends beyond the outer surface of the collector/reservoir.

4. The collector/reservoir of claim 1, wherein the conduit has a valve in it.

5. The collector/reservoir of claim 1, further comprising a connection means for connecting the collector/reservoir to a source of said spilling material.

6. A method of collecting a spilling material comprising:

providing an uninflated collector/reservoir folded-up for compact storage, inflating the collector/reservoir near the spill site with an auto-inflator in less than 20 seconds, so that the collector/reservoir unrolls or unfolds automatically with a bottom and an inflated side wall that define an interior volume, collecting the spilling material in the interior volume of the collector/reservoir, and emptying the spilling material from the interior volume.

7. The method of claim 6, wherein emptying the spilling material is done by causing the spilling material to flow out from a conduit that extends from the interior volume of the collector/reservoir to the outside surface of the collector/reservoir.

* * * * *